Figure 2:
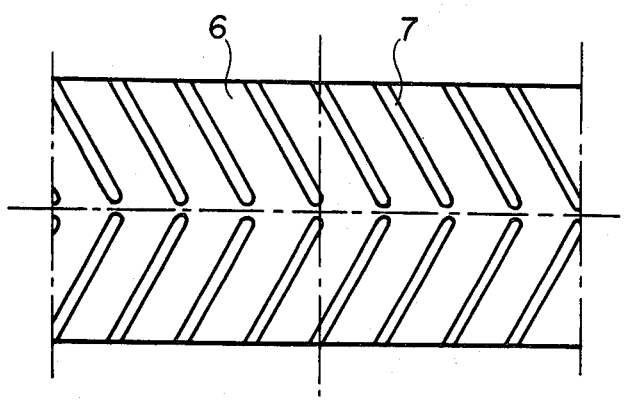

United States Patent [19]

Rasmussen et al.

[11] Patent Number: 4,669,331

[45] Date of Patent: Jun. 2, 1987

[54] ECCENTRIC RING AND ECCENTRIC WHERE THE ECCENTRIC RING HAS POLYGON-SHAPED CROSS SECTION

[76] Inventors: Hans M. Rasmussen, Hunderupvej 125, DK-4230 Odense M; Niels Andersen, Annelisevaenget 4, DK-5270 Odense N, both of Denmark

[21] Appl. No.: 798,689

[22] PCT Filed: Feb. 22, 1985

[86] PCT No.: PCT/DK85/00011
§ 371 Date: Oct. 29, 1985
§ 102(e) Date: Oct. 29, 1985

[87] PCT Pub. No.: WO85/03985
PCT Pub. Date: Sep. 12, 1985

[30] Foreign Application Priority Data

Feb. 29, 1984 [DK] Denmark .................... 1243/84

[51] Int. Cl.$^4$ ........................................ G05G 1/00
[52] U.S. Cl. ........................................... 74/570
[58] Field of Search ..................... 74/50, 55, 570; 137/625.32; 251/310; 308/DIG. 4; 384/901, 286, 292

[56] References Cited

U.S. PATENT DOCUMENTS

| | | |
|---|---|---|
| 2,054,549 | 9/1936 | Alden .............. 308/DIG. 4 |
| 2,471,187 | 5/1949 | Atwater ........... 308/DIG. 4 |
| 4,120,544 | 10/1978 | Hüber . |
| 4,199,995 | 4/1980 | Murakami ............... 74/55 |

*Primary Examiner*—Lenard A. Footland
*Attorney, Agent, or Firm*—Darby & Darby

[57] ABSTRACT

An eccentric ring and eccentric where the eccentric ring has polygon-shaped cross section with plane side faces whereon a piston rod for a cylinder is abutting is designed with channels (9) for lubricant said channels (9) extending from the plane side faces (2) of the eccentric ring (1) into the middle of the bearing surface (6) of the eccentric ring. In the bearing surface (6) there is provided a system of helical grooves (7) that have such direction, pitch and depth that under the influence of its adhesive power to the rotating bearing journal (8) lubricant is accelerated to describe a movement from the edges of the bearing in a direction towards its center line thus creating a hydraulic pressure whereby the lubricant is pressed through the channels (5) to the plane polygon faces.

1 Claim, 2 Drawing Figures

4,669,331

ECCENTRIC RING AND ECCENTRIC WHERE THE ECCENTRIC RING HAS POLYGON-SHAPED CROSS SECTION

The present invention relates to an eccentric ring and eccentric where the eccentric ring has polygon-shaped cross section and plane side faces.

In connection with piston pumps and piston engines crank and piston rod are used for converting rotary motion into a rectilinear reciprocating motion.

Eccentric and eccentric rod are likewise used for this purpose.

The fundamental difference between crank and eccentric is functionally slight.

The characteristic feature of both is that a circular cylindrical eccentrically rotating bearing journal surface exerts rotary pressure and pulling forces on an encircling ring which is also circular cylindrical.

The known piston or eccentric rod is fixedly secured to this ring whereby the rotary motion is converted into a rectilinear reciprocating motion.

Lubrication of the sliding faces is provided in many known manners by immersion in lubricant, pressure lubrication and the like.

The eccentric ring according to the invention is characteristic in that channels for lubricant extend from the plane side faces of the eccentric ring into the middle of the bearing surface of the eccentric ring a system of helical grooves being provided in said bearing surface. The lubrication system is thereby integrated as an integral part of its structure and function.

The side faces of the polygon are plane and form an abutment for the pistons in the cylinders arranged on the pump housing at right angles to the side faces.

The pistons being in the nature of plungers have also a plane pressure face facing the polygon face.

From each polygon face in the middle of the area where the piston is abutting there is provided a lubrication channel extending into the middle of the bearing where the eccentric journal is rotating.

The helical grooves provided in the cylindrical bearing surface of the eccentric ring are of such direction, pitch, depth and number that lubricant from the chamber wherein the entire device is situated, under the influence of the adhesive power to the rotating bearing journal, is accelerated to describe a movement from the edges of the bearing in a direction towards its centre line.

By this pump-like movement there is created a hydraulic pressure between bearing surface and bearing journal in an area concentrically along the centre line of the bearing.

By this pressure lubricant can be pressed out through the above-mentioned oil channels to the polygon faces.

The counter-pressures existing between the polygon faces and the contact faces of the pistons are highly varying due to the movement of the pistons. When a piston is pressed away from the centre, the pressure is high because in such movement it will perform a working stroke. In its back stroke, however, the piston will exert lower surface pressure and thus lower counter-pressure with regard to the hydraulic pressure of the lubricant.

In a preferred embodiment of the invention there is concentrically in the bearing journal of the eccentric provided a groove which spans approx. 180°. Thus by the rotation of the bearing journal in bearing of the eccentric ring the groove will act as a rotating valve in respect of the lubricant, said valve successively opening and shutting off the lubrication channels thereby obtaining an effect similar to that of a lubrication pump with valves but in a very simple manner.

It is thus avoided that this lower counter-pressure will result in too low hydraulic pressure in the centre of the eccentric bearing in that the groove will act as a reservoir but only over part of the circumference of the journal. This groove has such a size and is so positioned on the bearing journal that it passes under the lubrication channels leading to the bearing of the eccentric ring. The length of the groove in the bearing surface at right angles to the axis thereof has moreover been chosen so that its front end in motion will open the lubrication channel under the piston having started its outward movement and its rear end in a similar manner shut off the lubrication channel to the polygon face under the piston having just passed its upper dead centre.

The eccentric bearing as a whole thereby acts as a combination of pump and control valve for the lubricant at the same time while it maintains by itself a desirable film of lubricant.

The abutment of the piston or pistons on the polygon faces will moreover have the effect that this is prevented from turning with the eccentric bearing journal and the end face of each piston describes a movement at right angles to the polygon face on which it abuts.

A particular advantage by the described polygon-shaped eccentric ring is that when used according to its purpose it can actuate any number of pistons from one to just as many as there are faces on the polygon.

It is thereby possible with the same simple structure to make pumps with stepwise variable stroke volume in that cylinders with pistons are built together according to requirements and wishes.

The lubrication channels in the polygon faces which are not used are plugged.

Figure 1:
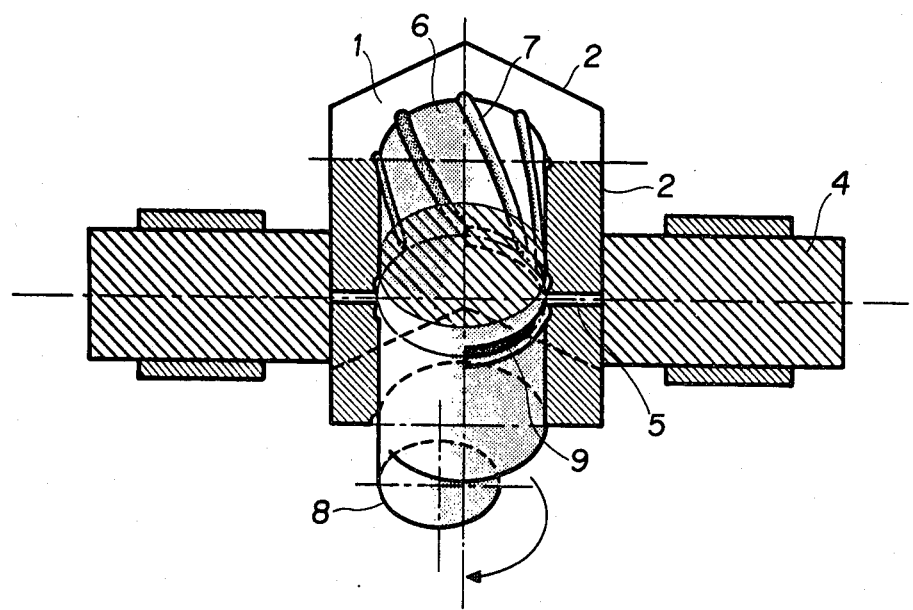

The drawing shows an eccentric ring with its eccentric according to the invention, wherein FIG. 1 is an axonometric view of the eccentric ring with eccentric and pistons, the eccentric being shown cut, and FIG. 2 is the bearing surface of the eccentric ring unfolded.

The eccentric ring 1 has side faces in such a manner that these form a polygon-shaped, in this case hexagonal, body with plane faces 2. Pistons 4 movable in cylinders abut on these faces.

From the abutting faces of the pistons there are provided channels 5 extending into the bearing surface 6 which is provided with narrow, helical grooves 7 extending from the sides into the centre line of the bearing surface. The course of the grooves is shown in an unfolding (FIG. 2).

In the bearing surface 8 of the eccentric there has been cut a groove 9 concentrically with the bearing journal and being so long that it spans approx. 180°. One end of the groove is almost congruent the point on the bearing surface which is most eccentric, whereas the other end is situated approx. 180° therefrom in a direction opposite the sens rotation of the eccentric.

By turning the bearing journal 8 in the bearing 6 lubricant due to its adhesion to the bearing journal is accelerated in a direction towards the centre of the bearing where there is produced a hydraulic pressure pressing lubricant through the channels 5 in that the groove 9 by the turning of the bearing journal acts as a rotary valve which opens and shuts off the lubrication channels 5.

We claim:

1. In combination, an eccentric ring and and eccentric, the eccentric ring including a body having a polygonal shape in cross-section, the body having exterior planar side faces and an interior bearing surfce, the bearing surface having formed therein a plurality of helical grooves, the body having formed therein lubricant channels extending between the side faces and the bearing surface, the eccentirc including a bearing journal, the bearing journal including a groove formed concentrically therein, the bearing journal groove spanning approximately 180°.

* * * * *